US012755901B2

(12) United States Patent
Saito

(10) Patent No.: US 12,755,901 B2
(45) Date of Patent: Oct. 6, 2026

(54) MULTILAYER CERAMIC ELECTRONIC DEVICE AND DIELECTRIC CERAMIC COMPOSITION

(71) Applicant: TAIYO YUDEN CO., LTD., Tokyo (JP)

(72) Inventor: Yuta Saito, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 142 days.

(21) Appl. No.: 18/937,984

(22) Filed: Nov. 5, 2024

(65) Prior Publication Data

US 2025/0182970 A1 Jun. 5, 2025

(30) Foreign Application Priority Data

Nov. 30, 2023 (JP) ................................ 2023-202893

(51) Int. Cl.
*H01G 4/12* (2006.01)
*H01G 4/012* (2006.01)

(52) U.S. Cl.
CPC ........... *H01G 4/1227* (2013.01); *H01G 4/012* (2013.01)

(58) Field of Classification Search
CPC ........ H01G 4/1227; H01G 4/012; H01G 4/30; H01G 4/08; H01G 4/1209; H01G 4/1218; H01G 4/232; C04B 35/4682; C04B 2235/3206; C04B 2235/3215; C04B 2235/3224; C04B 2235/3232; C04B 2235/3243; C04B 2235/3279; C04B 2235/3418; C04B 2235/768; Y02E 60/13
See application file for complete search history.

(56) References Cited

U.S. PATENT DOCUMENTS 12,002,630 B2 * 6/2024 Mizuno .................. H01G 4/008
2009/0237859 A1 * 9/2009 Nakamura ............... H01G 4/33 156/89.12
2024/0404754 A1 * 12/2024 Sasaki ...................... C04B 35/64
2025/0182970 A1 * 6/2025 Saito ..................... H01G 4/1227
2025/0210275 A1 * 6/2025 Koo ......................... C04B 35/64

FOREIGN PATENT DOCUMENTS

WO 2008072448 A1 6/2008
WO WO-2024171939 A1 * 8/2024 ........... H01G 4/1227

* cited by examiner

*Primary Examiner* — Dion R. Ferguson
(74) *Attorney, Agent, or Firm* — Law Office of Katsuhiro Arai

(57) ABSTRACT

A multilayer ceramic electronic device includes a dielectric layer that has a main phase having a perovskite structure expressed by a general formula $ABO_3$ and a secondary phase which includes barium, chromium, and a transition metal element other than chromium, and has a molar ratio of a sum of the chromium and the transition metal element other than the chromium to barium of the secondary phase of 7.0 or more, a plurality of internal electrode layers that sandwich the dielectric layer and face each other, and a plurality of external electrodes each of which is electrically coupled to each of the plurality of internal electrode layers.

9 Claims, 9 Drawing Sheets

MULTILAYER CERAMIC ELECTRONIC DEVICE AND DIELECTRIC CERAMIC COMPOSITION

CROSS-REFERENCE TO RELATED APPLICATION

This application is based upon and claims the benefit of priority of the prior Japanese Patent Application No. 2023-202893, filed on Nov. 30, 2023, the entire contents of which are incorporated herein by reference.

FIELD

A certain aspect of the present disclosure relates to a multilayer ceramic electronic device and a dielectric ceramic composition.

BACKGROUND

In high-frequency communication systems such as mobile phones, multilayer ceramic electronic components such as multilayer ceramic capacitors (MLCCs) are used to eliminate noise.

SUMMARY OF THE INVENTION

According to an aspect of the embodiments, there is provided a multilayer ceramic electronic device including: a dielectric layer that has a main phase having a perovskite structure expressed by a general formula $ABO_3$ and a secondary phase which includes barium, chromium, and a transition metal element other than chromium, and has a molar ratio of a sum of the chromium and the transition metal element other than the chromium to barium of the secondary phase of 7.0 or more; a plurality of internal electrode layers that sandwich the dielectric layer and face each other; and a plurality of external electrodes each of which is electrically coupled to each of the plurality of internal electrode layers.

According to another aspect of the embodiments, there is provided a dielectric ceramic composition including: a main phase having a perovskite structure expressed by a general formula $ABO_3$; and a secondary phase which includes barium, chromium, and a transition metal element other than chromium, wherein a molar ratio of a sum of the chromium and the transition metal element other than the chromium to barium of the secondary phase is 7.0 or more.

DETAILED DESCRIPTION

In recent years, in order to make multilayer ceramic capacitors smaller and with larger capacity, the dielectric layer has been made thinner and more highly stacked. However, when the dielectric layer is made thinner, structural defects caused by sintering and grain growth of the dielectric particles in the dielectric layer and the metal particles in the internal electrode layer are more likely to occur, which may lead to an increase in the short-circuit rate and a decrease in reliability due to a shortened life.

Therefore, a technology has been disclosed that suppresses grain growth of metal particles in the internal electrode layer by forming segregated grains that are oxides containing chromium in the dielectric layer (for example, see Internal Publication No. 2008/072448).

However, there is no disclosure of the detailed composition of the chromium-containing segregated grains, and there is a risk that reliability may be significantly degraded depending on the composition of the segregated grains.

Hereinafter, an exemplary embodiment will be described with reference to the accompanying drawings.

Figure 1:
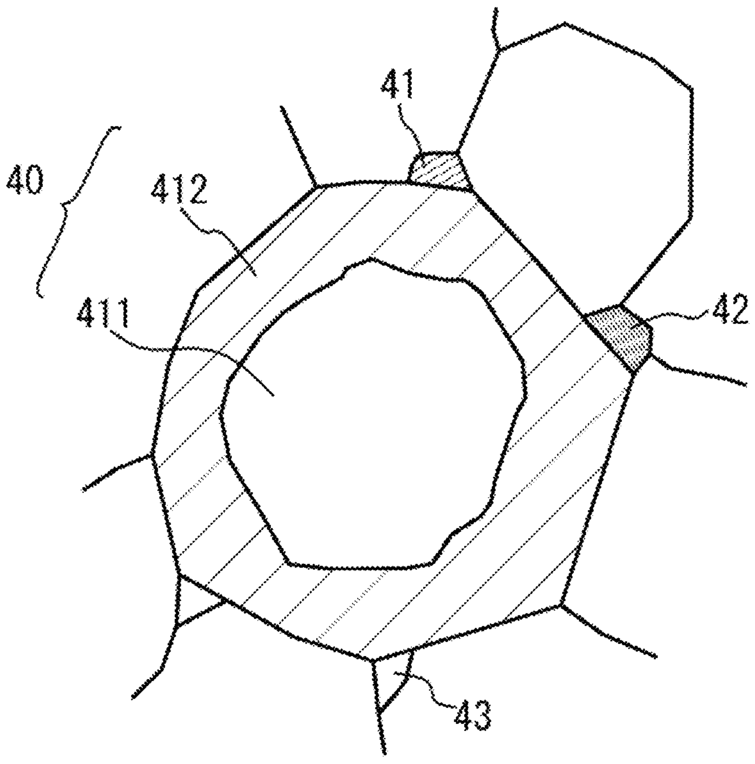
FIG. 1 illustrates a dielectric ceramic composition according to a first embodiment.

(First Embodiment) The dielectric ceramic composition according to a first embodiment is a ceramic polycrystalline body including crystal grains having a perovskite structure represented by the general formula $ABO_3$. These ceramic polycrystalline bodies include one or more main phase crystal grains 40, as illustrated in FIG. 1.

The main phase crystal grains 40 have a perovskite structure represented by the general formula $ABO_3$. The main phase crystal grains 40 have, for example, a core-shell structure. When the main phase crystal grains 40 have the core-shell structure, the main phase crystal grains 40 have a substantially spherical core portion 411 and a shell portion 412 that surrounds and covers the core portion 411, as illustrated in FIG. 1. The core portion 411 is a crystal portion in which no additive compound is solid-solved or in which the amount of the additive compound solid-solved is small. The shell portion 412 is a crystal portion in which the additive compound is solid-solved and has a higher additive compound concentration than the additive compound concentration of the core portion 411.

Figure 2:
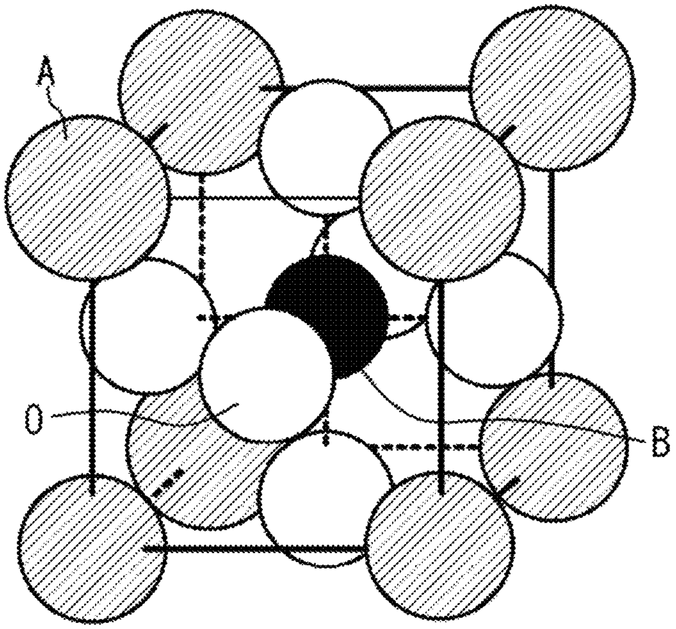
FIG. 2 illustrates a unit lattice.

Crystal grains having a perovskite structure, which are the main components of first crystal grains 41, have a unit cell as illustrated in FIG. 2. This unit cell has an A site located at the apex of the lattice, an O site located at the face center of the lattice, and a B site located within an octahedron with the O site as the apex. In the perovskite structure, alkaline earth metals that can take divalent cations such as barium (Ba), strontium (Sr), or calcium (Ca) are located at the A site, and hafnium (Hf) or zirconium (Zr), or titanium (Ti) that can take tetravalent cations are located at the B site.

The perovskite structure also allows a composition formula that deviates from the stoichiometric composition. That is, the ratio of the A-site element to the B-site element does not necessarily have to be 1:1, and defects may be generated within a range where the perovskite structure can be maintained. Furthermore, defects may also be generated regarding oxygen. For example, when the composition formula is $A_{\alpha}BO_{3-\beta}$, compositions in the ranges of $0.98 \le \alpha \le 1.01$ and $0 \le \beta \le 0.20$ are allowed.

However, due to the generation of oxygen vacancy, for example, the resistivity decreases and ionic conductivity is exhibited, which reduces the electrical life when used as a multilayer ceramic capacitor and increases the dielectric loss. For this reason, at least one of the alkaline earth elements magnesium (Mg), calcium (Ca), strontium (Sr), or barium (Ba) may be added to the main phase crystal grains 40 having the perovskite structure, if necessary. This can improve the resistivity and the electrical resistance.

In addition, if necessary, the main phase crystal grains 40 may contain at least one of the first transition elements scandium (Sc), titanium (Ti), vanadium (V), chromium (Cr), iron (Fe), cobalt (Co), nickel (Ni), copper (Cu), or zinc (Zn). This makes it possible to improve resistivity, increase electrical life, and reduce dielectric loss due to electrostatic capacity.

The main phase crystal grains 40 may also contain at least one of the second transition elements yttrium (Y), zirconium (Zr), niobium (Nb), molybdenum (Mo), ruthenium (Ru), rhodium (Rh), palladium (Pd), or silver (Ag) as necessary. This can improve resistivity, increase electrical life, and reduce dielectric loss relative to electrostatic capacity.

The main phase crystal grains 40 may also contain at least one of the third transition elements lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), tantalum (Ta), tungsten (W), rhenium (Re), osmium (Os), iridium (Ir), platinum (Pt), or gold (Au), as necessary. This can improve resistivity, increase electrical life, and reduce dielectric loss relative to electrostatic capacity.

By using at least one of the alkaline earth element, the first transition metal element, the second transition metal element, or the third transition metal element as an additive, at least one of the alkaline earth element, the first transition metal element, the second transition metal element, and the third transition metal element can be solid-solved from the interface of the main phase crystal grains 40 to the inside in the firing temperature range of 1000° C. to 1400° C. for obtaining a dielectric ceramic composition, thereby generating the core portion 411 and the shell portion 412 in the main phase crystal grains 40.

In the meantime, in a core-shell structure, generally, as the firing temperature increases, more of the various additives are solid-solved in the crystal grains made of barium titanate, and the shell portion 412 tends to become thicker and the grain size of the core portion 411 tends to become smaller. In the shell portion 412, an acceptor element with a smaller valence than titanium, such as magnesium or nickel, is solid-solved as a B-site element, suppressing the reduction of titanium during reduction firing and improving the insulation resistance. Therefore, as an example, in order to ensure high insulation resistance of the multilayer ceramic capacitor, it is necessary that the acceptor element is solid-solved in the shell portion 412.

However, excessive solid-solution of the acceptor element in the shell portion 412 may promote grain growth of the main phase crystal grains 40, increasing the short-circuit rate. Therefore, in order to ensure a high yield, it is necessary to precisely control the amount of the acceptor element solid-solved in the shell portion 412, but this precise control has been difficult.

The inventors have conducted extensive research and found that the short-circuit rate and reliability degradation can be suppressed by segregating the first crystal grains 41 illustrated in FIG. 1. Specifically, the inventors have found that the short-circuit rate and reliability degradation can be suppressed by segregating the first crystal grains 41, which contain barium, chromium, and transition metal elements other than chromium, and in which the molar ratio of the sum of chromium and transition metal elements other than chromium to barium is 7.0 or more.

It is thought that the secondary phase of oxides containing chromium suppresses abnormal grain growth during firing, suppresses the short-circuit rate, sufficiently promotes the diffusion of oxide ions during re-oxidation, and provides a sufficient electrical life. Furthermore, the presence of a transition metal with an ionic radius different from that of chromium and a transition metal with a valence different from that of chromium in addition to chromium sufficiently promotes the diffusion of oxide ions during re-oxidation, and provides a sufficient electrical life.

From the viewpoint of sufficiently suppressing degradation in reliability, the molar ratio of the sum of chromium and transition metal elements other than chromium to barium in the first crystal grains 41 is preferably 7.2 or more, and more preferably 7.5 or more.

On the other hand, if the molar ratio of the sum of chromium and transition metal elements other than chromium to barium in the first crystal grains 41 is too large, the electrical life may be reduced. Therefore, it is preferable to set an upper limit on the molar ratio of the sum of chromium and transition metal elements other than chromium to barium. In this embodiment, the molar ratio of the sum of chromium and transition metal elements other than chromium to barium in the first crystal grains 41 is preferably 9.0 or less, more preferably 8.8 or less, and even more preferably 8.5 or less.

If the amount of chromium in the first crystal grains 41 is small, the diffusion of oxide ions during the re-oxidation process may not be sufficiently promoted, and a sufficient electrical life may not be obtained. Therefore, it is preferable to set a lower limit on the amount of chromium in the first crystal grains 41. In this embodiment, the molar ratio of chromium to barium in the first crystal grains 41 is preferably 2.0 or more, more preferably 2.3 or more, and even more preferably 2.6 or more.

On the other hand, if the amount of chromium in the first crystal grains 41 is large, the electrical life may be reduced. Therefore, it is preferable to set an upper limit on the amount of chromium in the first crystal grains 41. In this embodiment, the molar ratio of chromium to barium in the first crystal grains 41 is preferably 6.0 or less, more preferably 5.5 or less, and even more preferably 5.0 or less.

The crystal system of the first crystal grains 41 is preferably orthorhombic. By having the crystal system of the first crystal grains 41 be orthorhombic, excessive diffusion of the additive element into the main phase crystal grains 40 via the first crystal grains 41 during firing is suppressed, and an increase in the short circuit rate can be suppressed.

The space group of the first crystal grains 41 is preferably Cmce. By the space group of the first crystal grains 41 being Cmce, excessive diffusion of the additive elements into the main phase crystal grains 40 via the first crystal grains 41 during firing is suppressed, and an increase in the short circuit rate can be suppressed.

In the first crystal grains 41, the transition metal element other than chromium is preferably an element located near chromium in the periodic table. For example, in the first crystal grains 41, the transition metal element other than chromium is preferably at least one of titanium, vanadium, manganese, iron, or nickel. For example, two or more elements may be used in combination as the transition metal element other than chromium. For example, titanium and nickel may be used in combination as the transition metal element other than chromium.

The inclusion of the first crystal grains 41 in the dielectric ceramic composition can be confirmed by the following procedure.

First, the surface of the dielectric ceramic composition is exposed. There are no particular limitations on the method of exposure, and methods such as cutting or polishing the element can be used. In this case, in order to fully observe the internal ceramic structure, it is preferable to finally obtain a smoothness that can be judged as a mirror surface using a diamond paste or the like of 2 microns or less. The above method of cutting or polishing the element is suitable for observation by SEM. Furthermore, a thin piece with a thickness of 100 nm or less can be obtained from the surface of the dielectric ceramic composition having the smoothness that can be judged as a mirror surface using an ion beam or the like. The above thin piece is suitable for observation by STEM.

Next, the composition of the first crystal grains 41 is identified by an energy dispersive X-ray spectrometer (EDS) or a wavelength dispersive X-ray spectrometer (WDS) attached to a scanning electron microscope (SEM) or a scanning transmission electron microscope (STEM), an electron probe microanalyzer (EPMA), a laser irradiation type inductively coupled plasma mass spectrometry (LA-ICPMS), or the like.

For example, in EDS measurement, the composition is simply identified by the K-line intensity of chromium relative to the K-line or L-line of barium, the K-line intensity of titanium, the K-line intensity of vanadium, the K-line intensity of manganese, the K-line intensity of iron, and the K-line intensity of nickel. More specifically, from these intensities, a correction (ZAF correction) is made that takes into account the atomic number effect, the absorption effect, and the fluorescence excitation effect, and the ratio of each relative to the elemental content of barium is calculated, which is the ratio of each element.

When the sample thickness is sufficiently thin, for example, less than a few tens of nm, a correction may be made using the proportionality coefficient (K factor) used in the Cliff-Rolimer method to obtain the ratio of each element. In addition to the correction used in the Cliff-Rolimer method, a correction may be made taking into account the absorption effect of the sample to obtain the ratio of each element. The absorption effect of the sample can be corrected by determining the thickness and density of the sample. The thickness of the sample can be obtained, for example, by obtaining a convergent-beam electron diffraction (CBED) pattern under two-wave excitation conditions and analyzing the locking curve observed on a diffraction disk. The grains used to obtain the CBED pattern can be the main phase crystal grains 40 or the like. The density of the sample can be, for example, 6.02 $g/cm^3$, which is the density of barium titanate.

When performing EDS measurements, especially when using barium's La line and titanium's Kα line, their energy peaks are close to each other, and it may be difficult to adequately compare the element contents. For this reason, it is desirable that the Lβ2 line and LIIIab line of barium be obtained with sufficient intensity without peak overlap during measurement. Specifically, it is desirable that the intensity at the peak is 10,000 counts or more. At this time, the intensity of the characteristic X-rays from barium can be determined and the element content can be calculated, so even if the La lines of barium and the Kα lines of Ti overlap, the intensity of the Kα lines of titanium can be determined, and the element content can be evaluated with high accuracy.

The crystal grains obtained by the above method, in which the molar ratio of chromium and transition metals other than chromium (one or more of titanium, vanadium, manganese, iron, or nickel) to barium is 7.0 or more, are determined to be the first crystal grains 41. In other words, when a secondary phase is detected in which the element ratio of chromium and transition metals other than chromium (one or more of titanium, vanadium, manganese, iron, or nickel) to barium is higher compared to the main phase crystal grains 40 made of barium titanate present in the surroundings, it is determined that the first crystal grains 41 are present. In this case, when an SEM is used for observation, the first crystal grains 41 are characterized by being observed to have a relatively low brightness and appear darker than the main phase crystal grains 40 in observation using a backscattered electron image (BSE image). Furthermore, when an STEM is used for observation, the first crystal grains 41 are characterized by being observed to have a relatively low brightness and appear darker than the main phase crystal grains 40 in a high-angle annular dark-field scanning transmission electron microscopy image (HAADF-STEM image).

Furthermore, when the grain diameter of the first crystal grains 41 is smaller than the spatial resolution of the EDS analysis in the SEM, it is desirable to identify the composition of the first crystal grains 41 using a scanning transmission electron microscope (STEM).

Furthermore, when confirming the crystal structure of the first crystal grains 41, it is preferable to acquire selected area electron diffraction (SAED) patterns on the first crystal grains 41 using a transmission electron microscope (TEM) and analyze the obtained electron diffraction pattern. It is further preferable to obtain electron diffraction patterns for multiple crystal zone axes and to confirm that indexing is possible with crystal structures having similar crystal systems, space groups, and lattice constants.

There is no particular limitation on the method for calculating the cross-sectional area of the main phase crystal grains 40 and the first crystal grains 41. However, for example, for anyone of the main phase crystal grains 40 and the first crystal grains 41, image processing is performed on the BSE image acquired by SEM, and the number of pixels of the area occupied by each of the main phase crystal grains 40 and the first crystal grains 41 in the image is counted, thereby calculating the cross-sectional area of each of the main phase crystal grains 40 and the first crystal grains 41. When the total cross-sectional area of the main phase crystal grains 40 and the first crystal grains 41 is calculated by the above method, for example, the ratio of the first crystal grains 41 is preferably 0.050% to 45.0%, preferably 0.50% to 25.0%, and more preferably 1.0% to 15.0%.

As illustrated in FIG. 1, in addition to the main phase crystal grains 40 and the first crystal grains 41, the dielectric ceramic composition preferably contains second crystal grains or glass grains 43 that have a different composition or crystal structure from the main phase crystal grains 40 and the first crystal grains 41 and contain silicon. By containing at least one of second crystal grains 42 and the glass grains 43 in the dielectric ceramic composition, it becomes possible to sinter the dielectric ceramic composition at 1300° C. or less and sufficiently densify the dielectric ceramic composition. As the second crystal grains 42, crystal grains such as silicate ($SiO_2$), enstatite ($MgSiO_3$), barium magnesium silicate ($BaMgSiO_4$), and fresnoite ($Ba_2TiSi_2O_8$) can be used. As the glass grains 43, glass grains such as silicate ($SiO_2$), enstatite ($MgSiO_3$), barium magnesium silicate ($BaMgSiO_4$), and fresnoite ($Ba_2TiSi_2O_8$) can be used.

The dielectric ceramic composition may contain other compounds derived from added substances or electrodes, such as geikierite ($MgTiO_3$), manganese nickel oxide ((Mn, Ni)O), and pyrophanite ($MnTiO_3$).

As illustrated in FIG. 1, the first crystal grains 41 and the second crystal grains 42 are preferably located at the grain boundaries of the main phase crystal grains 40. This is because a decrease in the resistivity of the dielectric ceramic composition can be suppressed.

The first crystal grains 41 and the second crystal grains 42 are preferably located at the grain boundary triple junctions of the main phase crystal grains 40. This is because a decrease in the resistivity of the dielectric ceramic composition can be suppressed. The grain boundary triple junctions are the boundaries between three crystal grain boundaries.

The glass grains 43 are preferably located at the grain boundaries of the main phase crystal grains 40. This is because it is possible to suppress a decrease in the relative dielectric constant of the dielectric ceramic composition.

The glass grains 43 are preferably located at the grain boundary triple junctions of the main phase crystal grains 40. This is because it is possible to suppress a decrease in the relative dielectric constant of the dielectric ceramic composition.

It is preferable that the shell portion 412 of the main phase crystal grains 40 contains a rare earth element. This is because it improves the electrical life of the dielectric ceramic composition.

(Second Embodiment) In a second embodiment, a multilayer ceramic capacitor 100 using the dielectric ceramic composition of the first embodiment will be described.

Figure 3:
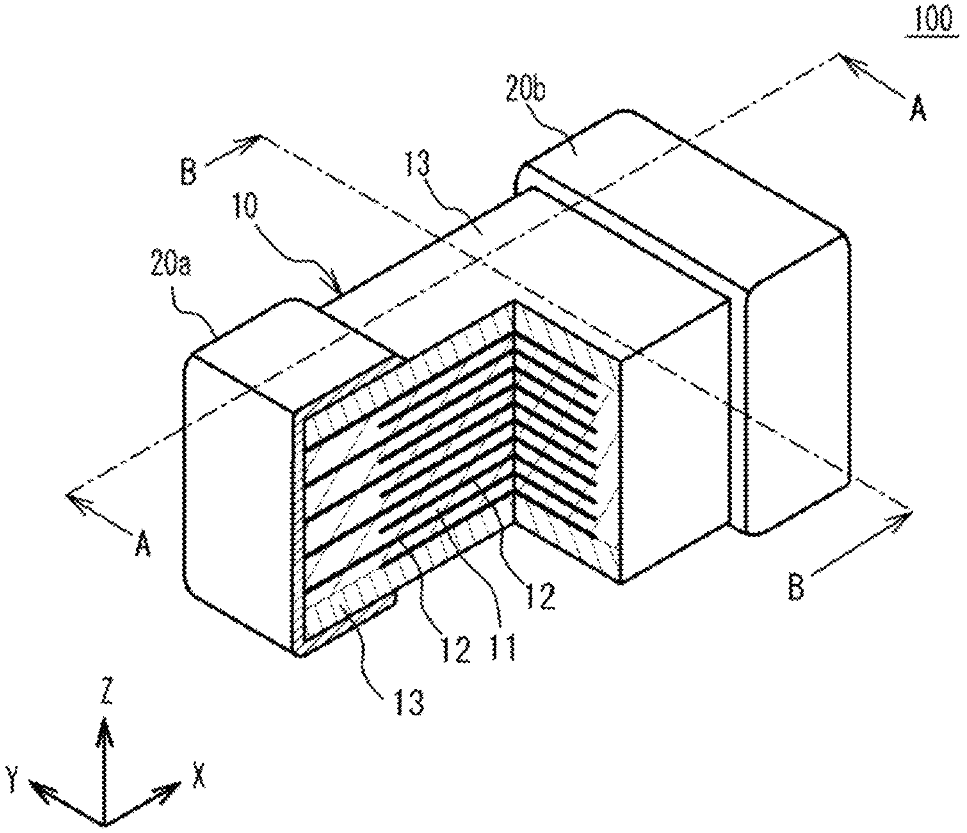
FIG. 3 illustrates a perspective view of a multilayer ceramic capacitor, in which a cross section of a part of the multilayer ceramic capacitor is illustrated.
Figure 4:
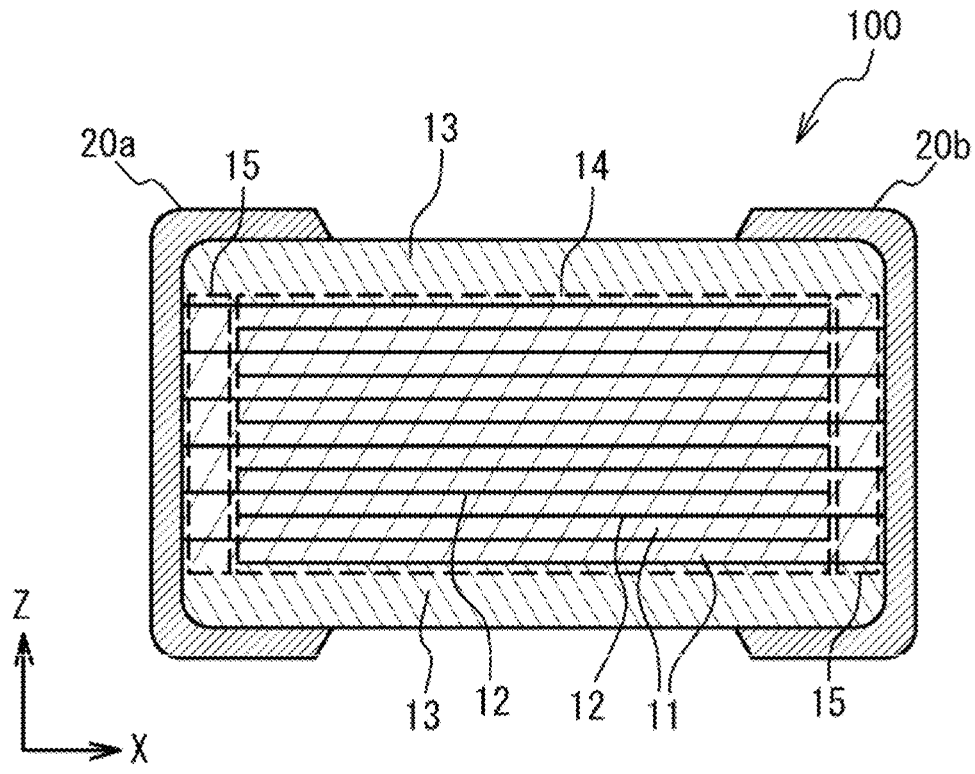
FIG. 4 is a cross-sectional view taken along line A-A in FIG. 4.
Figure 5:
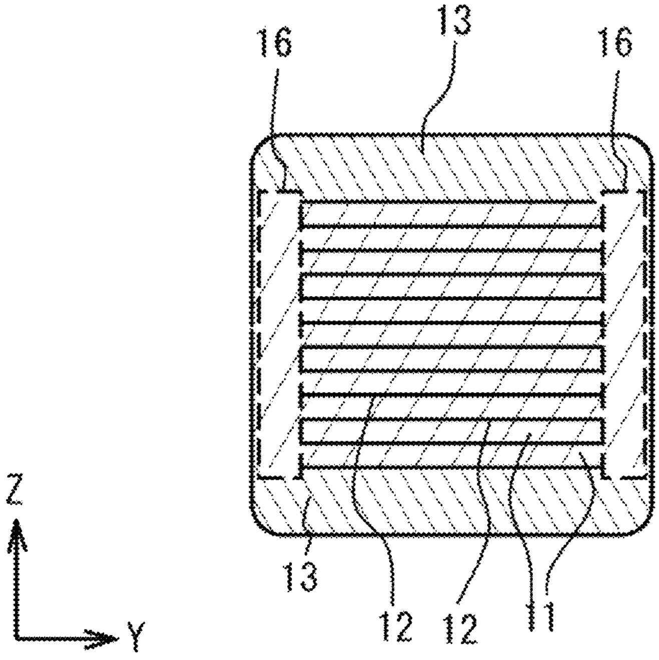
FIG. 5 is a cross-sectional view taken along line B-B in FIG. 3.

FIG. 3 illustrates a perspective view of the multilayer ceramic capacitor 100, in which a cross section of a part of the multilayer ceramic capacitor 100 is illustrated. FIG. 4 is a cross-sectional view taken along line A-A in FIG. 4. FIG. 5 is a cross-sectional view taken along line B-B in FIG. 3. As illustrated in FIG. 3 to FIG. 5, the multilayer ceramic capacitor 100 includes a multilayer chip 10 having a rectangular parallelepiped shape, and external electrodes 20*a* and 20*b* that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20*a* and 20*b* extends to the top face and the bottom face in the stack direction and the two side faces of the multilayer chip 10. However, the external electrodes 20*a* and 20*b* are spaced from each other.

The multilayer chip 10 has a structure in which dielectric layers 11 containing the dielectric ceramic composition and internal electrode layers 12 mainly composed of a base metal are alternately stacked. In other words, the multilayer chip 10 includes the internal electrode layers 12 facing each other and the dielectric layers 11 sandwiched between the internal electrode layers 12. The edges in the direction in which each internal electrode layer 12 extends are alternately exposed at a first end face provided with the external electrode 20*a* of the multilayer chip 10 and a second end face provided with the external electrode 20*b*. Thus, the internal electrode layers 12 are alternately electrically connected to the external electrode 20*a* and the external electrode 20*b*. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 may be the same as the main component of the dielectric layer 11 or may be different from the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

As illustrated in FIG. 4, the section where the internal electrode layer 12 connected to the external electrode 20*a* faces the internal electrode layer 12 connected to the external electrode 20*b* is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20*a* face each other with no internal electrode layer 12 connected to the external electrode 20*b* interposed therebetween is referred to as an end margin section 15. The section where the internal electrode layers 12 connected to the external electrode 20*b* face each other with no internal electrode layer 12 connected to the external electrode 20*a* interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 5, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

In the multilayer ceramic capacitor 100 according to this embodiment, at least a portion of the dielectric layer 11 in the capacity section 14 contains the main phase crystal grains 40 and the first crystal grains 41 illustrated in FIG. 1. This allows high reliability to be achieved, and high insulation resistance to be achieved.

The thickness of the dielectric layer 11 in the stacking direction is, for example, 0.50 μm or less, 0.40 μm or less, or 0.30 μm or less. The thickness of the dielectric layer 11 can be measured by observing the cross section of the multilayer ceramic capacitor 100 with a SEM (scanning electron microscope), measuring the thickness at 10 points for each of 10 different dielectric layers 11, and deriving the average value of all the measurement points.

The average thickness per layer of the internal electrode layer 12 in the stacking direction is, for example, 0.50 μm or less, 0.40 μm or less, or 0.30 μm or less. The thickness of the internal electrode layer 12 can be measured by observing the cross section of the multilayer ceramic capacitor 100 with a SEM (scanning electron microscope), measuring the thickness at 10 points on each of 10 different internal electrode layers, and deriving the average value of all the measurement points.

Figure 6:
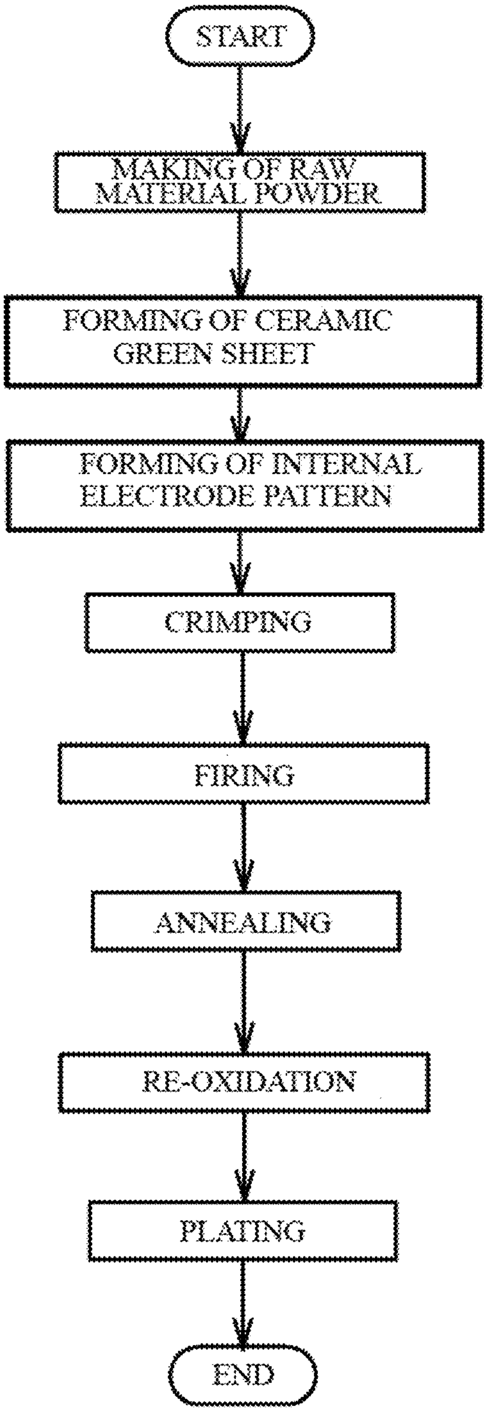
FIG. 6 illustrates a manufacturing method of a multilayer ceramic capacitor.

Next, a description will be given of a manufacturing method of the multilayer ceramic capacitors 100. FIG. 6 illustrates a manufacturing method of the multilayer ceramic capacitor 100.

(Making process of raw material powder) The dielectric ceramic composition for forming the dielectric layer 11 is prepared. Generally, an A site element and a B site element are included in the dielectric layer 11 in a sintered phase of grains of $ABO_3$. For example, barium titanate is tetragonal compound having a perovskite structure and has a high dielectric constant. Generally, barium titanate is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting barium titanate powder, in accordance with purposes. As an example, the additive of the dielectric ceramic composition of the first embodiment is used. If necessary, an oxide or a glass containing Zr (zirconium), V (vanadium), Cr (chromium), Co (cobalt), Ni (nickel), Li (lithium), B (boron), Na (sodium), K (potassium) may also be used. If necessary, an oxide of a rare earth element such as Sc (scandium), Y (yttrium), La (lanthanum), Ce (cerium), Pr (praseodymium), Nd (neodymium), Pm (promethium), Sm (samarium), Tb (terbium), Dy (dysprosium), Ho (holmium), Er (erbium), Tm (thulium), Y (ytterbium), and Lu (lutetium) may be added.

In order to generate the first crystal grains 41, for example, a barium titanate powder with an average particle size of 100 nm is prepared, and a predetermined amount of $BaCr_{10}O_{15}$, $Ho_2O_3$, NiO, $TiO_2$, MgO, and $SiO_2$ is added to 100 moles of the barium titanate powder. The $BaCr_{10}O_{15}$ powder is obtained by preparing barium carbonate ($BaCO_3$) powder and chromium oxide ($Cr_2O_3$) powder, wet mixing 5 moles of chromium oxide powder with 1 mole of barium carbonate powder, drying the mixed powder, and firing it at 1100 to 1300° C. for 1 to 3 hours in a reducing atmosphere with an oxygen partial pressure of $10^{-13}$ to $10^{-9}$ atm. For example, the ceramic material obtained as described above may be pulverized as necessary to adjust the particle size, or the particle size may be adjusted by combining it with a classification process. The above process results in $BaCr_{10}O_{15}$ powder.

For example, a compound containing an additive compound is wet mixed with barium titanate powder, and then dried and pulverized to prepare a ceramic material in which barium titanate powder and the additive compound are mixed. For example, the ceramic material obtained as described above may be pulverized as necessary to adjust the particle size, or may be combined with a classification process to adjust the particle size. The dielectric ceramic composition is obtained by the above process.

(Forming of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 51 is formed on a base material by, for example, a die coater method or a doctor blade method, and then dried. The base material is, for example, PET (polyethylene terephthalate) film. Figures of forming of the dielectric green sheet is omitted.

Figure 7A:
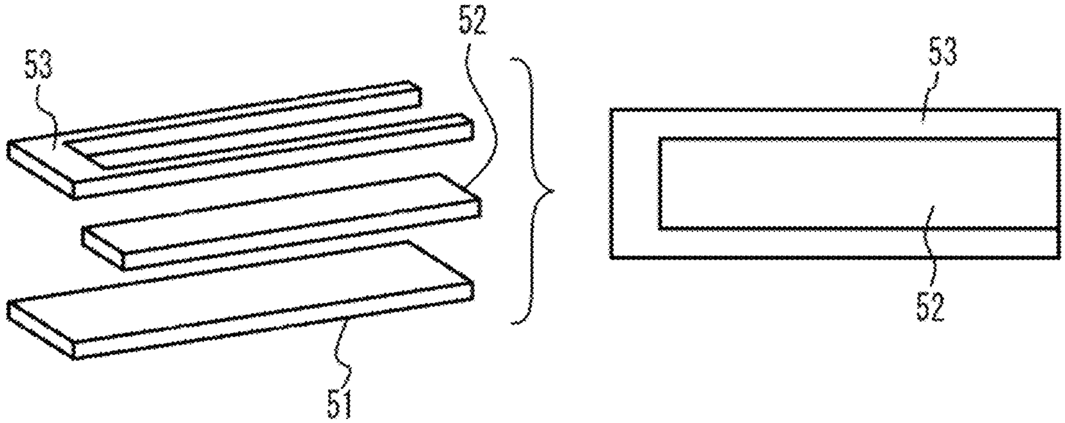
FIG. 7A and FIG. 7B illustrate a forming process of an internal electrode.

(Forming of internal electrode pattern) Next, as illustrated in FIG. 7A, a metal conductive paste containing an organic binder for forming internal electrodes is printed on the surface of the ceramic green sheet 51 by screen printing, gravure printing, or the like. Internal electrode patterns 52 are arranged alternately to a pair of external electrodes. Ceramic particles are added to the metal conductive paste as a co-material. Although the main component of the ceramic particles is not particularly limited, it is preferably the same as the main component ceramic of the dielectric layer 11. For example, barium titanate having an average particle size of 50 nm or less may be uniformly dispersed.

Next, a binder such as ethyl cellulose and an organic solvent such as terpineol are added to the dielectric ceramic composition obtained in the raw material powder manufacturing process, and the mixture is kneaded in a roll mill to form a dielectric pattern paste for the reverse pattern layer. As illustrated in FIG. 7A, on the ceramic green sheet 51, a dielectric pattern 53 is arranged by printing a dielectric pattern paste in the peripheral area where the internal electrode pattern 52 is not printed, and a gap with the internal electrode pattern 52 is filled. The ceramic green sheet 51 on which the internal electrode pattern 52 and the dielectric pattern 53 are printed is referred to as a stack unit.

Figure 7B:
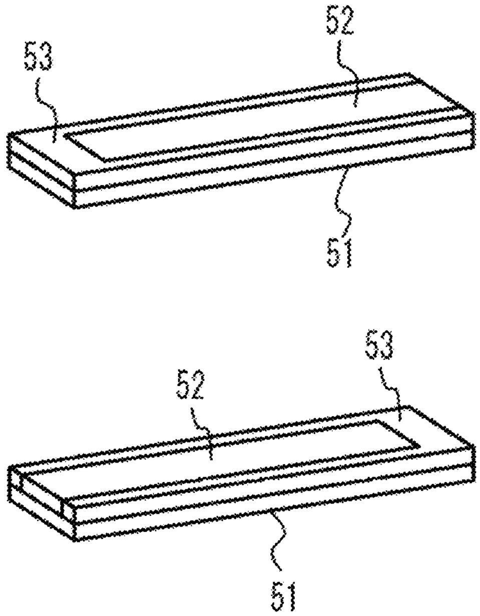

Thereafter, as illustrated in FIG. 7B, the internal electrode layers 12 and the dielectric layers 11 are arranged alternately, and the internal electrode layers 12 have edges on both longitudinal end surfaces of the dielectric layers 11. The stack units are stacked so that they are alternately exposed and drawn out alternately to a pair of the external electrodes 20*a* and 20*b* having different polarities. For example, the number of stacked layers of the internal electrode pattern 52 is set to 100 to 1000 layers.

Figure 8:
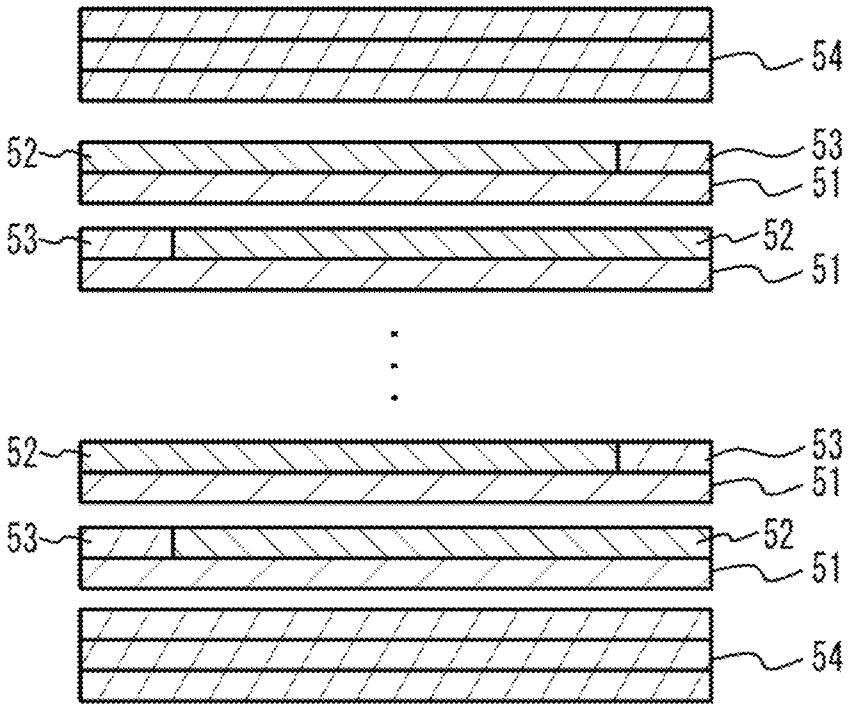
FIG. 8 illustrates a crimping process.

(Crimping Process) As illustrated in FIG. 8, a predetermined number (for example, 2 to 10 layers) of cover sheets 54 are stacked on top and bottom of the multilayer body in which the stack units are stacked and bonded by thermo-compression. As an example of the ceramic material for the cover sheet 54, the dielectric ceramic composition described above can be used. Thereafter, the multilayer body is cut into a predetermined chip size (for example, 1.0 mm×0.5 mm).

(Firing process) After de-binding the ceramic multilayer body thus obtained in an $N_2$ atmosphere, air atmosphere or the like, a metal paste that will become the base layer of the external electrodes 20*a* and 20*b* is applied by a dip method, and the ceramic multilayer body is fired in a reductive atmosphere under an oxygen partial pressure of $10^{-12}$ to $10^{-9}$ atm, 1100° C. to 1300° C. for 10 minutes to 2 hours. In this way, the multilayer ceramic capacitor 100 is obtained. Note that in the firing step, the temperature is rapidly raised. The temperature increase rate in the firing step is, for example, 6000° C./h. Thereby, the time required for firing can be substantially shortened, and higher mass productivity can be achieved. Thus, the main phase crystal grain 40 and the first crystal grain 41 can be generated in at least a portion of the dielectric layer 11 in the capacity section 14.

(Annealing process) After that, the multilayer ceramic capacitor 100 is gradually cooled by performing an annealing process in a reductive atmosphere under an oxygen partial pressure of $10^{-12}$ to $10^{-9}$ atm, 900° C. to 1150° C. for 30 minutes to 2 hours. The cooling speed is, for example, 200° C./h.

(Re-oxidation treatment process) Thereafter, re-oxidation treatment may be performed at 600° C. to 1000° C. in an $N_2$ gas atmosphere.

(Plating process) Thereafter, a metal coating such as Cu, Ni, Sn and so on is performed on the base layer of the external electrodes 20*a* and 20*b* by plating. Through the above steps, the multilayer ceramic capacitor 100 is completed.

Figure 9:
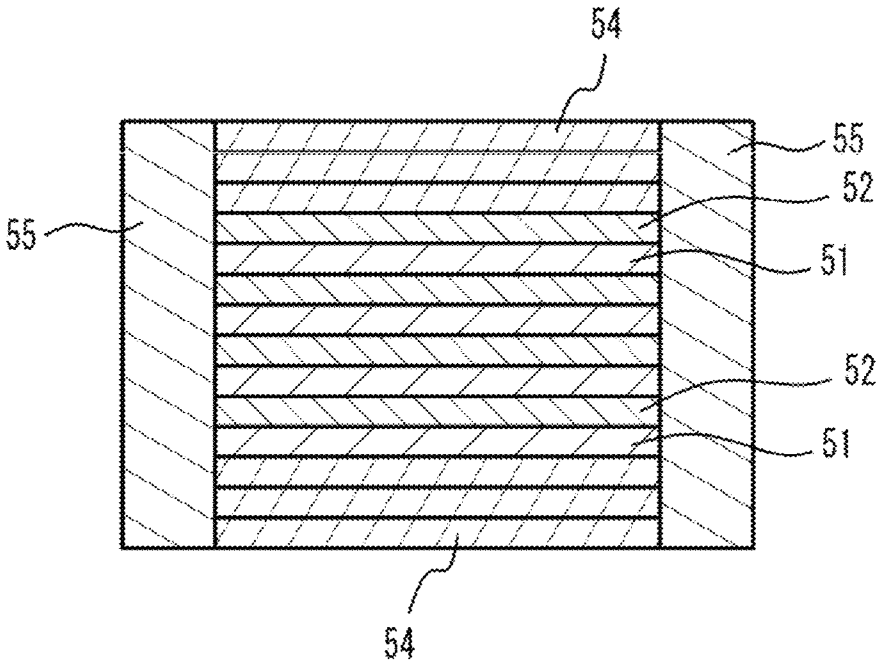
FIG. 9 illustrates a case where a side margin section.

The side margin section may be attached or coated on the side surface of the ceramic multilayer body. Specifically, as illustrated in FIG. 9, the ceramic multilayer body is obtained by alternately stacking the ceramic green sheets 51 and the internal electrode patterns 52 having the same width as the ceramic green sheets 51. Next, a sheet formed of the dielectric pattern paste may be attached as a side margin section 55 to the side surface of the ceramic multilayer body.

The manufacturing method according to this embodiment makes it possible to form the main phase crystal grain 40 illustrated in FIG. 1 in at least a portion of the dielectric layer 11 in the capacity section 14, and also to form the first crystal grain 41. This makes it possible to suppress the rate of short circuits and to prevent degradation in reliability.

Note that in the above embodiments, a multilayer ceramic capacitor has been described as an example of a multilayer ceramic electronic component, but this is not limiting. For example, other multilayer ceramic electronic components such as varistors and thermistors may also be used.

EXAMPLES (Example 1) Barium titanate powder with an average particle size of 100 nm was prepared, and 0.8 mol of $Ho_2O_3$, 0.2 mol of $BaCr_{10}O_{15}$, 0.5 mol of NiO, 0.5 mol of $TiO_2$, 0.5 mol of MgO, and 1.0 mol of $SiO_2$ were added to 100 mol of barium titanate powder.

The dielectric ceramic composition was mixed with ethanol, toluene, and PVB (polyvinyl butyral) resin to prepare a dielectric slurry. This slurry was formed into a ceramic green sheet using a die coater and dried. A metal conductive paste containing the main component metal of the internal electrode layer 12, a co-material, a binder (ethyl cellulose), a solvent, and other auxiliary agents as necessary was prepared using a planetary ball mill and screen printed on a ceramic green sheet. Eleven stack units with metal conductive paste printed on the ceramic green sheets were stacked, and cover sheets were stacked on the top and bottom of the stack units. Then, the multilayer structure was obtained by thermocompression bonding and cut into a predetermined shape. After the obtained multilayer structure was debindered in an $N_2$ atmosphere, a metal conductive paste containing a metal filler mainly composed of nickel, a co-material, a binder, a solvent and so on for the base layer was applied to both end faces and each side of the multilayer structure, and dried. Then, the metal conductive paste for the base layer was fired at 1300° C. in a reducing atmosphere at the same time as the multilayer structure to obtain a sintered body. The temperature rise rate was 6000° C./h. The shape dimensions of the obtained sintered body were length 0.6 mm, width 0.3 mm, and height 0.3 mm. Then, an annealing treatment was performed at 900 to 1150° C. for 1 hour. Then, a re-oxidation treatment was performed at 950° C. Then, a plating treatment was performed to form a Cu plated layer, a Ni plated layer, and a Sn plated layer on the surface of the base layer, and the multilayer ceramic capacitor 100 was obtained. The average thickness of the dielectric layer 11 was 0.5 μm.

(Example 2) In Example 2, 0.8 mol of $Ho_2O_3$, 0.2 mol of $BaCr_{10}O_{15}$, 0.5 mol of $Fe_2O_3$, 0.15 mol of $V_2O_5$, 0.5 mol of MgO, and 1.0 mol of $SiO_2$ were added to 100 mol of barium titanate powder. The other conditions were the same as in Example 1.

(Example 3) In Example 3, 0.8 mol of $Ho_2O_3$, 0.2 mol of $BaCr_{10}O_{15}$, 0.5 mol of $TiO_2$, 0.25 mol of $Fe_2O_3$, 0.5 mol of MgO, and 1.0 mol of $SiO_2$ were added to 100 mol of barium titanate powder. The other conditions were the same as in Example 1.

(Example 4) In Example 4, 0.8 mol of $Ho_2O_3$, 0.2 mol of $BaCr_{10}O_{15}$, 0.5 mol of NiO, 0.5 mol of $TiO_2$, 0.5 mol of MgO, and 1.0 mol of $SiO_2$ were added to 100 mol of barium titanate powder. The other conditions were the same as in Example 1.

(Example 5) In Example 5, 0.8 mol of $Ho_2O_3$, 0.2 mol of $BaCr_{10}O_{15}$, 0.5 mol of NiO, 0.5 mol of MgO, and 1.0 mol of $SiO_2$ were added to 100 mol of barium titanate powder. The other conditions were the same as in Example 1.

(Example 6) In Example 6, 0.8 mol of $Ho_2O_3$, 0.15 mol of $BaCr_{10}O_{15}$, 0.5 mol of NiO, 0.5 mol of $TiO_2$, 0.5 mol of MgO, and 1.0 mol of $SiO_2$ were added to 100 mol of barium titanate powder. The other conditions were the same as in Example 1.

(Example 7) In Example 7, 0.8 mol of $Ho_2O_3$, 0.1 mol of $BaCr_{10}O_{15}$, 0.5 mol of NiO, 0.5 mol of $TiO_2$, 0.5 mol of MgO, and 1.0 mol of $SiO_2$ were added to 100 mol of barium titanate powder. The other conditions were the same as in Example 1.

(Example 8) In Example 8, 0.8 mol of $Ho_2O_3$, 0.2 mol of $BaCr_2O_3$, 0.5 mol of NiO, 0.5 mol of $TiO_2$, 0.5 mol of $MnCO_3$, 0.5 mol of MgO, and 1.0 mol of $SiO_2$ were added to 100 mol of barium titanate powder. The other conditions were the same as in Example 1.

(Example 9) In Example 9, 0.8 mol of $Ho_2O_3$, 0.2 mol of $BaCr_{10}O_{15}$, 0.5 mol of NiO, 0.25 mol of $Fe_2O_3$, 0.15 mol of $V_2O_5$, 0.5 mol of MgO, and 1.0 mol of $SiO_2$ were added to 100 mol of barium titanate powder. The other conditions were the same as in Example 1.

(Example 10) In Example 10, 0.8 mol of $Ho_2O_3$, 0.2 mol of $BaCr_{10}O_{15}$, 0.5 mol of $TiO_2$, 0.25 mol of $Fe_2O_3$, 0.5 mol of MgO, and 1.0 mol of $SiO_2$ were added to 100 mol of barium titanate powder. The other conditions were the same as in Example 1.

(Example 11) In Example 11, 0.8 mol of $Ho_2O_3$, 0.2 mol of $BaCr_{10}O_{15}$, 0.5 mol of NiO, 0.5 mol of $MnCO_3$, 0.15 mol of $V_2O_5$, 0.5 mol of MgO, and 1.0 mol of $SiO_2$ were added to 100 mol of barium titanate powder. The other conditions were the same as in Example 1.

(Example 12) In Example 12, 0.8 mol of $Ho_2O_3$, 0.1 mol of $BaCr_{10}O_{15}$, 1.5 mol of NiO, 0.5 mol of $TiO_2$, 0.5 mol of MgO, and 1.0 mol of $SiO_2$ were added to 100 mol of barium titanate powder. The other conditions were the same as in Example 1.

(Example 13) In Example 13, 0.8 mol of $Ho_2O_3$, 0.1 mol of $BaCr_{10}O_{15}$, 1.0 mol of NiO, 0.5 mol of $TiO_2$, 0.5 mol of MgO, and 1.0 mol of $SiO_2$ were added to 100 mol of barium titanate powder. The other conditions were the same as in Example 1.

(Example 14) In Example 14, 0.8 mol of $Ho_2O_3$, 0.1 mol of $BaCr_{10}O_{15}$, 1.0 mol of NiO, 0.5 mol of $MnCO_3$, 0.5 mol of MgO, and 1.0 mol of $SiO_2$ were added to 100 mol of barium titanate powder. The other conditions were the same as in Example 1.

(Example 15) In Example 15, 0.8 mol of $Ho_2O_3$, 0.1 mol of $BaCr_{10}O_{15}$, 1.0 mol of NiO, 0.25 mol of $Fe_2O_3$, 0.5 mol of MgO, and 1.0 mol of $SiO_2$ were added to 100 mol of barium titanate powder. The other conditions were the same as in Example 1.

(Example 16) In Example 16, 0.8 mol of $Ho_2O_3$, 0.2 mol of $BaCr_{10}O_{15}$, 0.5 mol of $MnCO_3$, 0.15 mol of $V_2O_5$, 0.5 mol of MgO, and 1.0 mol of $SiO_2$ were added to 100 mol of barium titanate powder. The other conditions were the same as in Example 1.

(Comparative Example 1) In Comparative Example 1, 0.8 mol of $Ho_2O_3$, 0.5 mol of $Cr_2O_3$, 0.5 mol of $Fe_2O_3$, 0.5 mol of $V_2O_5$, 0.5 mol of MgO, and 1.0 mol of $SiO_2$ were added to 100 mol of barium titanate powder. The other conditions were the same as in Example 1.

(Comparative Example 2) In Comparative Example 2, 0.8 mol of $Ho_2O_3$, 0.5 mol of MgO, 0.5 mol of $MnCO_3$, 0.15 mol of $V_2O_5$, and 1.0 mol of $SiO_2$ were added to 100 mol of barium titanate powder. Other conditions were the same as in Example 1.

For Examples 1 to 16 and Comparative Examples 1 and 2, it was confirmed whether segregated grains were generated in addition to the barium titanate grains of the main phase. As a result, it was confirmed that in all of Examples 1 to 16 and Comparative Examples 1 and 2, segregated grains were generated in addition to the barium titanate grains of the main phase.

Next, it was confirmed whether the confirmed segregated grains were Ba-M-O phase. Here, M refers to one or more elements of chromium, nickel, titanium, iron, or manganese. As a result, in Examples 1 to 16 and Comparative Example 1, it was confirmed that the segregated grains were Ba-M-O phase.

Next, the molar ratio of M/Ba in the confirmed Ba-M-O phase was measured. As a result, the M/Ba ratio was 7.9 in Example 1, 7.1 in Example 2, 8.4 in Example 3, 7.6 in Example 4, 7.8 in Example 5, 8.2 in Example 6, 8.6 in Example 7, 8.9 in Example 8, 9.4 in Example 9, 8.8 in Example 10, 8.8 in Example 11, 8.6 in Example 12, 7.7 in Example 13, 7.2 in Example 14, 7.3 in Example 15, 7.9 in Example 16, and 6.5 in Comparative Example 1.

Next, the molar ratio of Cr/Ba in the confirmed Ba-M-O phase was measured. As a result, the Cr/Ba ratio was 3.5 in Example 1, 2.2 in Example 2, 2.1 in Example 3, 3.6 in Example 4, 4.8 in Example 5, 3.2 in Example 6, 2.9 in Example 7, 2.3 in Example 8, 2.7 in Example 9, 3.9 in Example 10, 4.6 in Example 11, 2.4 in Example 12, 2.6 in Example 13, 2.8 in Example 14, 3.6 in Example 15, 2.2 in Example 16, and 2.2 in Comparative Example 1.

Next, the M element in the confirmed Ba-M-O phase was identified. The elements of M were chromium, nickel, and titanium in Example 1, chromium, iron, and vanadium in Example 2, chromium, titanium, and iron in Example 3, chromium, titanium, and titanium in Example 4, chromium and nickel in Example 5, chromium, nickel, and titanium in Example 6, chromium, nickel, and titanium in Example 7, chromium, nickel, titanium and manganese in Example 8, chromium, nickel, iron and vanadium in Example 9, chromium, titanium and iron in Example 10, chromium, nickel, manganese, and vanadium in Example 11, chromium, nickel, and titanium in Example 12, chromium, nickel, and titanium in Example 13, chromium, nickel, and manganese in Example 14, chromium, nickel, and iron in Example 15, chromium, manganese, and vanadium in Example 16, and chromium, iron and vanadium in Comparative Example 1.

Next, the crystal system of the confirmed Ba-M-O phase was examined. The crystal system of the Ba-M-O phase was orthorhombic in Examples 1 to 16, and monoclinic in Comparative Example 1.

Next, the space group of the confirmed Ba-M-O phase was investigated. The space group of the Ba-M-O phase was Cmce in Examples 1 to 16, and C2/m in Comparative Example 1.

(Short circuit rate measurement) Next, the short circuit rate of Examples 1 to 16 and Comparative Examples 1 and 2 was measured. Using an LCR meter, the short circuit rate was evaluated under the condition that the Oscillation level (OSC) was 0.5V and a voltage with a frequency of 1 kHz was applied. For each of Examples 1 to 16 and Comparative Examples 1 and 2, 200 samples were evaluated, and the percentage of the number of samples that had a short circuit out of the 200 samples was taken as the short circuit rate (%).

(Reliability test) Next, the electrical life was measured for Examples 1 to 16 and Comparative Examples 1 and 2. For the cross sections of lines A-A and B-B illustrated in FIG. 4 and FIG. 5, the capacity section 14 was exposed by cutting or polishing, and finally, the thickness t of each of the dielectric layers 11 was calculated in a state where the smoothness that can be judged as a mirror surface was obtained using diamond paste or the like of 2 microns or less. The reliability test was performed by continuously applying a DC voltage in an environment of 150° C. so that the electric field strength V/t applied to the dielectric layer was 30V/μm, and measuring the change over time in the DC current value flowing through the multilayer ceramic capacitor. The electrical life of the multilayer ceramic capacitor was determined as the time from the application of the DC voltage to when the resistance value of the multilayer ceramic capacitor deteriorated and fell below 10002.

If the short circuit rate was 25% or less and the average electrical life was greater than 3000 min, the overall judgment was judged as very good "double circle", if the average electrical life was greater than 1000 min, the overall judgment was judged as good "o", and otherwise the overall judgment was judged as unacceptable "x". The results are shown in Table 1. The overall judgement of all of Examples 1 to 16 was very good "double circle" or good "o", while the overall judgement of both Comparative Examples 1 and 2 was unacceptable "x".

TABLE 1

| | | Ba—M—O PHASE | | | | | | SHORT | | |
|---|---|---|---|---|---|---|---|---|---|---|
| | SEGRE-GATION GRAIN | PRESENCE/ ABSENCE | M/Ba MOLAR RATIO | Cr/Ba MOLAR RATIO | M | CRYSTAL SYSTEM | SPACE GROUP | CIRCUIT RATE (%) | LIFE (min) | JUDGE |
| EXAMPLE 1 | PRESENCE | PRESENCE | 7.9 | 3.5 | Cr, Ni, Ti | ORTHO-RHOMBIC | Cmce | 10 | 5100 | ◎ |

TABLE 1-continued

| | | Ba—M—O PHASE | | | | | | SHORT | | |
|---|---|---|---|---|---|---|---|---|---|---|
| | SEGREGATION GRAIN | PRESENCE/ ABSENCE | M/Ba MOLAR RATIO | Cr/Ba MOLAR RATIO | M | CRYSTAL SYSTEM | SPACE GROUP | CIRCUIT RATE (%) | LIFE (min) | JUDGE |
| EXAMPLE 2 | PRESENCE | PRESENCE | 7.1 | 2.2 | Cr, Fe, V | ORTHO-RHOMBIC | Cmce | 25 | 1400 | ○ |
| EXAMPLE 3 | PRESENCE | PRESENCE | 8.4 | 2.1 | Cr, Ti, Fe | ORTHO-RHOMBIC | Cmca | 25 | 2400 | ○ |
| EXAMPLE 4 | PRESENCE | PRESENCE | 7.6 | 3.6 | Cr, Ni, Ti | ORTHO-RHOMBIC | Cmce | 5 | 3500 | ◎ |
| EXAMPLE 5 | PRESENCE | PRESENCE | 7.8 | 4.8 | Cr, Ni | ORTHO-RHOMBIC | Cmce | 5 | 1700 | ○ |
| EXAMPLE 6 | PRESENCE | PRESENCE | 8.2 | 3.2 | Cr, Ni, Ti | ORTHO-RHOMBIC | Cmce | 15 | 5600 | ◎ |
| EXAMPLE 7 | PRESENCE | PRESENCE | 8.6 | 2.9 | Cr, Ni, Ti | ORTHO-RHOMBIC | Chice | 15 | 4200 | ◎ |
| EXAMPLE 8 | PRESENCE | PRESENCE | 8.9 | 2.3 | Cr, Ni, Ti, Mn | ORTHO-RHOMBIC | Cmce | 15 | 2800 | ○ |
| EXAMPLE 9 | PRESENCE | PRESENCE | 9.4 | 2.7 | Cr, Ni, Fe, V | ORTHO-RHOMBIC | Cmce | 10 | 1200 | ○ |
| EXAMPLE 10 | PRESENCE | PRESENCE | 8.8 | 3.9 | Cr, Ti, Fe | ORTHO-RHOMBIC | Cmce | 0 | 2200 | ○ |
| EXAMPLE 11 | PRESENCE | PRESENCE | 8.8 | 4.6 | Cr, Ni, Mn, V | ORTHO-RHOMBIC | Cmce | 0 | 1500 | ○ |
| EXAMPLE 12 | PRESENCE | PRESENCE | 8.6 | 2.4 | Cr, Ni, Ti | ORTHO-RHOMBIC | Omce | 20 | 3000 | ◎ |
| EXAMPLE 13 | PRESENCE | PRESENCE | 7.7 | 2.6 | Cr, Ni, Ti | ORTHO-RHOMBIC | Cmce | 25 | 4700 | ◎ |
| EXAMPLE 14 | PRESENCE | PRESENCE | 7.2 | 2.8 | Cr, Ni, Mn | ORTHO-RHOMBIC | Cmce | 10 | 2500 | ○ |
| EXAMPLE 15 | PRESENCE | PRESENCE | 7.3 | 3.6 | Cr, Ni, Fe | ORTHO-RHOMBIC | Cmce | 10 | 2000 | ○ |
| EXAMPLE 16 | PRESENCE | PRESENCE | 7.9 | 2.2 | Cr, Mn, V | ORTHO-RHOMBIC | Cmce | 20 | 2100 | ○ |
| COMPARATIVE EXAMPLE 1 | PRESENCE | PRESENCE | 6.5 | 2.2 | Cr, Fe, V | MONO-CLINIC | C2/m | 25 | 150 | X |
| COMPARATIVE EXAMPLE 2 | PRESENCE | ABSENCE | | | | | | 100 | | X |

In Comparative Example 2, the short circuit rate was 100%, and a non-defective product could not be obtained, so the reliability test could not be performed. This is thought to be because the Ba-M-O phase was not generated in Comparative Example 2, and abnormal grain growth was not suppressed. In contrast, the short circuit rate was suppressed to 25% or less in Examples 1 to 16 and Comparative Example 1. This is thought to be because the Ba-M-O phase was generated and abnormal grain growth was suppressed.

In all of Examples 1 to 16, the average electrical life exceeded 1000 min. This is thought to be because the M/Ba molar ratio in the Ba-M-O phase was 7.0 or more. In Comparative Example 1, the average electrical life fell below 1000 min. This is thought to be because the M/Ba molar ratio was less than 7.0.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:

a dielectric layer that has a main phase having a perovskite structure expressed by a general formula $ABO_3$ and a secondary phase which includes barium, chromium, and a transition metal element other than chromium, and has a molar ratio of a sum of the chromium and the transition metal element other than the chromium to barium of the secondary phase of 7.0 or more;

a plurality of internal electrode layers that sandwich the dielectric layer and face each other; and a plurality of external electrodes each of which is electrically coupled to each of the plurality of internal electrode layers.

2. The multilayer ceramic electronic device as claimed in claim 1, wherein a molar ratio of the chromium to the barium in the secondary phase is 2.0 or more.

3. The multilayer ceramic electronic device as claimed in claim 1, wherein a crystal system of the secondary phase is orthorhombic.

4. The multilayer ceramic electronic device as claimed in claim 1, wherein a space group of the secondary phase is Cmce.

5. The ceramic electronic device as claimed in claim 1, wherein the transition metal element other than the chromium is at least one of titanium, vanadium, manganese, iron, or nickel.

6. The multilayer ceramic electronic device as claimed in claim 1, wherein the transition metal element other than the chromium is titanium and nickel.

7. The multilayer ceramic electronic device as claimed in claim 1, wherein the main phase includes at least barium or calcium in an A site and includes at least one of titanium or zirconium in a B site.

8. A dielectric ceramic composition comprising:

a main phase having a perovskite structure expressed by a general formula $ABO_3$; and a secondary phase which includes barium, chromium, and a transition metal element other than chromium, wherein a molar ratio of a sum of the chromium and the transition metal element other than the chromium to barium of the secondary phase is 7.0 or more.

9. The dielectric ceramic composition as claimed in claim 8, wherein a molar ratio of chromium to barium in the secondary phase is 2.0 or more.

* * * * *